United States Patent [19]

Corn et al.

[11] Patent Number: 5,781,738
[45] Date of Patent: *Jul. 14, 1998

[54] PROCEDURE FOR SAFELY TERMINATING NETWORK PROGRAMS DURING NETWORK LOGOFF

[75] Inventors: Vance Edward Corn; Steven Michael French, both of Austin, Tex.

[73] Assignee: International Business Machines Corporation, Armonk, N.Y.

[*] Notice: The term of this patent shall not extend beyond the expiration date of Pat. No. 5,564,017.

[21] Appl. No.: 685,739

[22] Filed: Jul. 24, 1996

Related U.S. Application Data

[63] Continuation of Ser. No. 269,336, Jun. 30, 1994, Pat. No. 5,564,017.

[51] Int. Cl.$^6$ .................................................. G06F 9/00
[52] U.S. Cl. ............... 395/200.57; 364/286; 364/DIG. 1
[58] Field of Search .......................... 395/800, 200.1, 395/500, 670, 671, 651, 182.22

[56] References Cited

U.S. PATENT DOCUMENTS

| | | | |
|---|---|---|---|
| 4,780,821 | 10/1988 | Crossley | 395/670 |
| 4,805,134 | 2/1989 | Calo et al. | 395/610 |
| 5,129,087 | 7/1992 | Will | 395/704 |
| 5,270,773 | 12/1993 | Sklut et al. | 399/20 |
| 5,343,512 | 8/1994 | Wang et al. | 379/59 |
| 5,418,952 | 5/1995 | Morley et al. | 395/800 |
| 5,428,782 | 6/1995 | White | 395/671 |
| 5,432,924 | 7/1995 | D'Souza et al. | 395/500 |
| 5,465,392 | 11/1995 | Baptist et al. | 455/38.3 |
| 5,564,017 | 10/1996 | Corn et al. | 395/200.1 |

OTHER PUBLICATIONS

Elrad, "Modeling Distributed Termination With Pre-Defined Partial Termination Ordering", IEEE, 1990, pp. 373–376.

*Primary Examiner*—Alyssa H. Bowler
*Assistant Examiner*—Walter D. Davis
*Attorney, Agent, or Firm*—David A. Mims, Jr.; Mark S. Walker

[57] ABSTRACT

A process for terminating a client server network connection that includes a first automatic termination of all programs executing on the client from code accessed from the server. The disconnection processing interrogates the client computer system to determine any open program files or libraries. Network program files or libraries result in a user prompting to determine whether they should be automatically terminated. In an alternate embodiment, a profile may indicate whether automatic termination will take place without user notification. Once all network loaded programs have been terminated, the disconnection process proceeds normally to sever the network connection.

4 Claims, 3 Drawing Sheets

PROCEDURE FOR SAFELY TERMINATING NETWORK PROGRAMS DURING NETWORK LOGOFF

This is a continuation of U.S. Pat. application Ser. No. 08/269,336 filed Jun. 30, 1994, now U.S. Pat. No. 5,564,017.

BACKGROUND OF THE INVENTION

1. Field of the Invention

The present invention is directed to procedures for operating a computer system so that a termination of network interconnections safely terminates all programs executing across the network. More particularly, the present invention is directed to a computer implemented process for ensuring that client computer processors remove from memory all programs executing across the network.

2. Background and Related Art

The client/server computing model allows many client computer systems to run programs stored on one or more servers. The client and server computer systems are interconnected by a network, either a local area network or a wide area network, that is controlled by a network operating system. Existing network operating systems include Novell NetWare, Microsoft LAN Manager, and IBM LAN Server. Each of these network operating systems provides a mechanism for a user of a client workstation to connect to the network and begin using the resources such as data files and programs from the server computer system. This connection, or logon session, enables client processing over the network. Once connected a user may store data to the server or may begin execution of a program stored on the server. Execution of a program stored on the server results in portions of the executable program being loaded into the memory of the client computer system with execution occurring on the client computer system as though the program were stored locally.

The user of a client workstation who has completed use of the server resources may disconnect or logoff from the network. Existing network operating systems provide no facility for ensuring that all client computer system programs executed from the server have been properly terminated by the user. While some network operating systems check for files remaining open across the network, none check for loaded executable programs using programs or libraries across the network. Once the network connection has been severed, the programs in the memory of the client system are no longer operable. However, these programs still reside in the memory of the client computer system taking up a valuable resource. These inoperable programs also have the potential to cause operational failures to the computer system. User selection of a computer program executing from the server after disconnecting from that server may cause the client system to crash or become unusable.

Thus, there exists a technical problem of being able to determine at logoff whether or not server files are being used by the client computer system.

SUMMARY OF THE INVENTION

The present invention is directed to solving the problem of disconnecting a client from a server with open server files on the client. The present invention provides a method of terminating a network connection between a first and second computer system with controlled terminations of programs running in the first computer system that were loaded across the network from the server system. The method of the present invention involves receiving a signal to terminate the network connection, testing the first computer system to first determine all programs running on the system, testing to determine which of those programs have one or more files open across the network, determining whether each of the programs should be automatically terminated, and terminating those programs prior to terminating the network connection.

It is therefore an object of the present invention to provide a process for safely terminating a network connection without leaving portions of executable programs in the memory of a client computer system.

It is yet another object of the present invention to detect and automatically terminate programs running across the network.

The foregoing and other objects, features and advantages of the invention will be apparent from the following more particular description of a preferred embodiment of the invention, as illustrated in the accompanying drawing wherein like reference numbers represent like parts of the invention.

DETAILED DESCRIPTION

Figure 1:
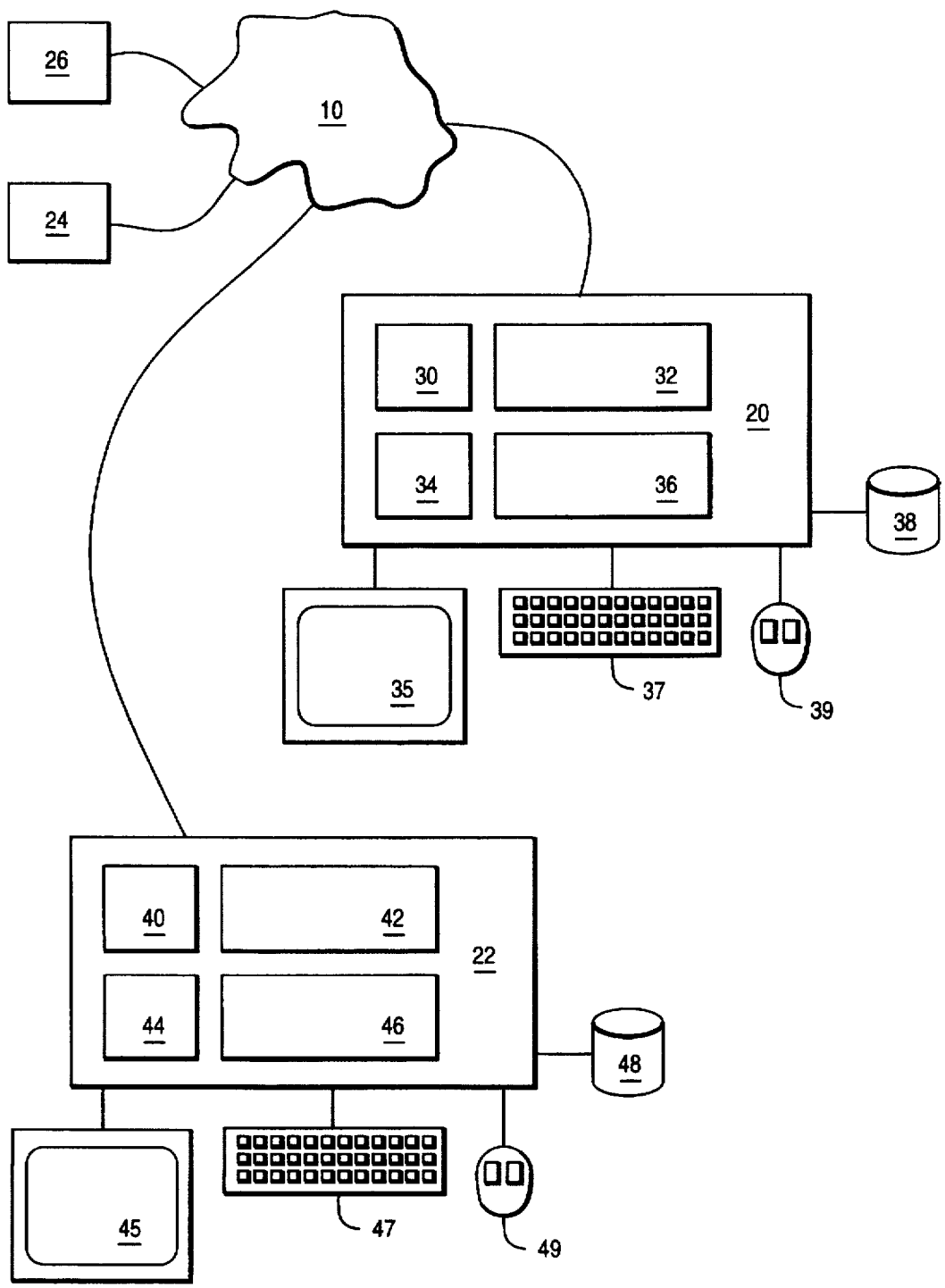
FIG. 1 is a block diagram illustrating a system in which the present invention operates.

Client/server computer systems operate in modern network computing environments. FIG. 1 illustrates an example of such an network computer system. Server computer system 20 provides data storage resources and program storage resources to the network. Client computer system 22 is connected to the network and is able to use resources from the server 20. Similarly client workstations 24 and 26 are connected to the network and able to use the shared resources of server workstation 20.

The network 10 can be any known local area network (LAN) or wide area network (WAN) such as a token ring network or Ethernet network. Operations on the network are controlled by a network operating system such as the Novell NetWare Operating System or the LAN Server Operating System from IBM. The network operating system controls the details of transferring requests for services between the client and server computer systems and manages the system administration including details such as authenticating users and establishing connections for a particular user of the system.

Client and server computer systems typically have similar configurations, though this is not a requirement. Server computer system 20 has one or more central processing unit, 30 main memory 32, network controller 34, and input/output controller 36. The input/output controller controls the use of the display monitor 35, the keyboard 37, a pointing device 39 and disk storage 38. Client workstation is similarly configured with one or more processors 40, main memory 42, network controller 44, input/output controller 46, and monitor 45, keyboard 47, pointing device 49, and disk drive 48. A client workstation will typically have smaller memory and disk storage than the server workstation. It is possible to have a client workstation which has no disk storage at all relying only on the server disk storage. Computer systems 24 and 26 are configured similarly to computer system 22.

Figure 2:
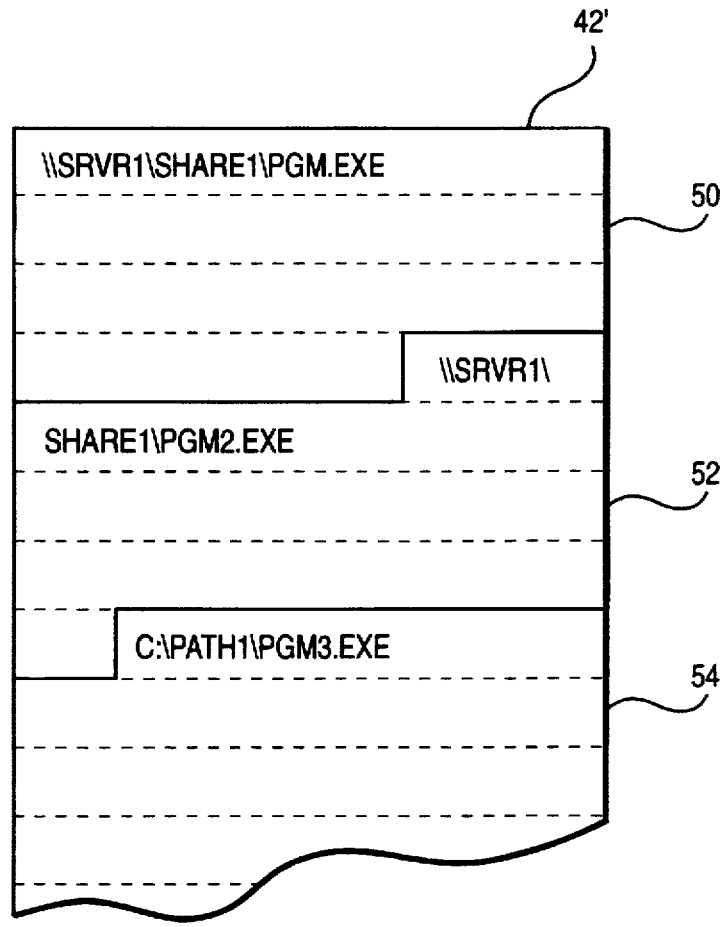
FIG. 2 is an illustration of the memory allocation of a client computer system.

The user at a client workstation 22 is able to run programs stored locally on disk 48 or programs stored on the server disk 38. Most network operating Systems allow the client system user to specify whether execution is to occur in the client workstation processor and memory space or in the server processor and memory space. Execution of a program in the client computer system memory space results in portions of the executable program being loaded into the memory 42 of the client workstation. An example of this memory layout is illustrated in FIG. 2. The first program 50 is loaded into the first portion of client computer system memory 42 prime. In the example this is identified as "SRVR1SHARE1PGM.EXE". This name is shown for illustration purposes only, and the format of the name is not controlling. This example name conforms to the universal naming convention (UNC) for network file names, the de facto personal computer industry standard for networked resources. In the universal naming convention the presence of two backslashes ("SR") indicates that the name following is the name of a server. Thus, "SRVR1" is the name of server 20 of the present invention. The name following the first single backslash is the resource identifier or share name. Following the second backslash is the relative path of the program that is executing.

The user of the client computer system 22 may disconnect from the network or server by entering a logoff command. This command will typically release the network resources assigned to that user and prohibit that user from further accessing the server 20. This provides a means of security as well as a means to efficiently share the resources. Existing logoff procedures provide no means for determining whether portions of a server stored program are loaded into the memory of the client computer system 22. Thus, after disconnecting from the network, program SO will remain in the memory of computer system 22 thereby taking up precious memory space. If the computer user mistakenly returns to the program 50 to continue execution, it is likely to fail because the entire program is usually not transferred into the memory of the client computer system. Since the linkages have been terminated access to this program will typically generate an error and may possibly cause the system to crash requiring the computer system to be rebooted.

Figure 3:
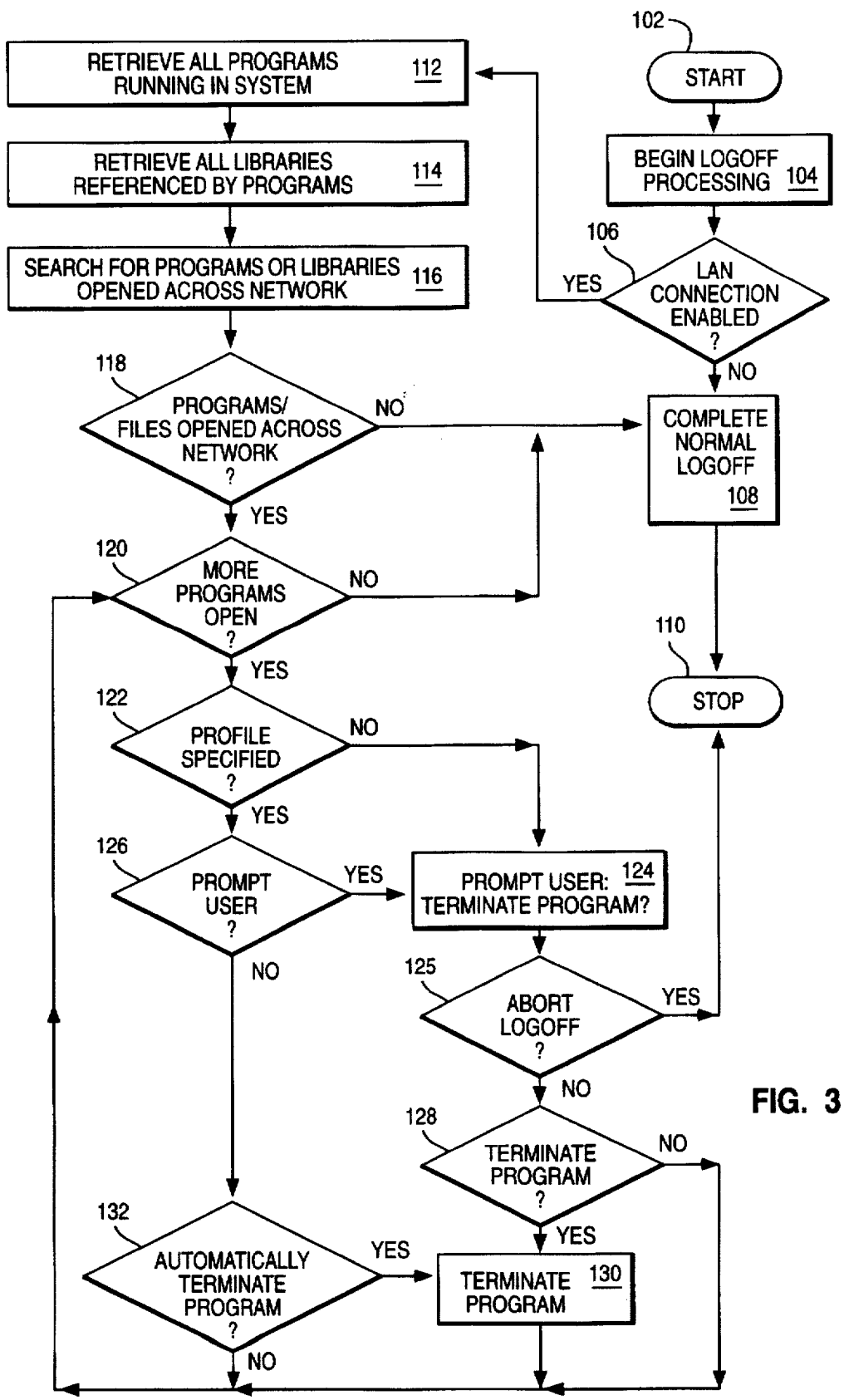
FIG. 3 is a flowchart illustrating the process steps of the present invention.

The present invention provides a modified logoff process that allows normal termination of programs loaded across the network. The process is illustrated in FIG. 3. Processing begins at step 102 following immediately into the initial logoff processing 104. Next, a test is made to determine whether a network connection has been enabled. If not, a normal logoff processing 108 is completed moving to the termination 110.

If a network connection was found in test 106, the system next retrieves the names of all programs running in the client computer system 112. Retrieval of executing programs can be accomplished by any of several methods known in the art for querying a system to determine executing programs. These programs are also tested to determine whether dynamic link libraries or other libraries are loaded across the network for operation of this program 114.

The programs and libraries that are opened on the computer system are searched to detect any that are from the network. This can be done by searching for programs or libraries which begin with a universal naming convention designator of double backslash and server name and searching for open files on network mounted drives or network mounted directories. In network operating systems that do not use the universal naming convention, a test is made based on the naming convention used for that particular network operating system. This search 116 results in a list of programs and files that are opened across the network.

Next a test is made to determine whether any programs or files are opened across the network 118 (i.e. whether the search list is empty). If none are found, the normal logoff processing 108 is completed to the termination point 110. If programs and files opened across the network are found, a test is made to determine if one or more of these remain open 120.

For each open program the following steps are performed. First, a test is made to determine whether the user has specified a profile containing standard processing of open network files. A typical profile would indicate whether a computer user is to be prompted to terminate each program or whether they are to be terminated automatically. If no profile is specified processing continues with the prompting of users 124. If the profile specifies prompting of users 126 control also moves to prompt 124.

The user is asked whether to automatically terminate the program or whether to exit the logoff process to enable some other determination by the user. If the user elects to terminate the logoff process 125, the process terminates by proceeding to terminator 110. If automatic termination of open programs has been selected 128 then the program is terminated automatically at 130. Automatic termination will also occur if the profile specifies automatic termination without user prompting 132. If the user requests no termination then control returns to step 120 to test whether more programs are open. When no more programs are found to be open processing returns to the complete logoff processing step 108 and termination 110.

The preferred embodiment includes profile tests 122, 126 and 132. In an alternate embodiment, the system will operate with no profile requiring prompting of the user at each step. The alternate embodiment omits steps 122, 126, and 132.

In operation, the process of the present invention increases the usability and reliability of network operations in a client server environment.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

We claim:

1. A method of terminating a network connection between a first computer system and a second computer system with controlled termination of programs running in said first computer system and loaded across a network, the method comprising the steps of:

receiving a signal to terminate a network connection;

testing said first computer system to determine all programs running on said first computer system;

testing to determine which of said programs running on said first computer system have one or more programs or libraries open across the network on said second computer system;

determining whether each of said determined programs on said first computer system should be automatically terminated; and terminating said determined programs prior to terminating the network connection.

2. The method of claim 1 wherein the step of determining whether each of said determined programs comprises the steps of:

presenting a message on the first computer system asking if each of said determined programs should be terminated;

receiving a response to that message; and terminating those programs indicated by said response to be automatically terminated.

3. A computer program product having a computer readable medium having computer program logic recorded thereon for terminating a network connection between a first computer system and a second computer system with controlled termination of programs running in said first computer system and loaded across a network, comprising:

computer readable means for receiving a signal to terminate a network connection;

computer readable means for testing said first computer system to determine all programs running on said first computer system;

computer readable means for testing to determine which of said programs running on said first computer system have one or more programs or libraries open across the network on said second computer system;

computer readable means for determining whether each of said determined programs on said first computer system should be automatically terminated; and computer readable means for terminating said determined programs prior to terminating the network connection.

4. The computer program of claim 3 wherein the computer readable means for determining whether each of said determined programs comprises:

computer readable means for presenting a message on the first computer system asking if each of said determined programs should be terminated;

computer readable means for receiving a response to that message; and computer readable means for terminating those programs indicated by said response to be automatically terminated.

* * * * *